United States Patent [19]
Hernandez

[11] Patent Number: 5,341,168
[45] Date of Patent: Aug. 23, 1994

[54] METHOD AND SYSTEM FOR RECEIVING AND TRANSFERRING IMAGES IN THREE DIMENSIONS

[76] Inventor: Ernesto O. Hernandez, Juan de la Barrera, 1711 Col. Martinez, Monterrey, N.L., Mexico

[21] Appl. No.: 981,551

[22] Filed: Nov. 25, 1992

[30] Foreign Application Priority Data

Nov. 27, 1991 [MX] Mexico ................................. 9102233

[51] Int. Cl.5 ............................................ H04N 13/00
[52] U.S. Cl. ........................................ 348/42; 348/44; 348/51
[58] Field of Search .................. 358/88, 226; 359/464, 359/465; 356/12; 353/6, 7

[56] References Cited

U.S. PATENT DOCUMENTS

| | | | |
|---|---|---|---|
| 4,009,951 | 3/1977 | Ihms | 359/464 |
| 4,295,153 | 10/1981 | Gibson | 358/88 |
| 4,568,970 | 2/1986 | Rockstead | 358/88 |
| 5,126,878 | 6/1992 | Trumbull | 358/91 |

Primary Examiner—Tommy P. Chin
Assistant Examiner—Vu Le
Attorney, Agent, or Firm—Gunn & Kuffner

[57] ABSTRACT

An optical system provides for receiving and transferring an image in three dimensions. The system includes at least two non-reflecting first receiving mirrors being disposed in a V-shaped configuration which allows the free pass of an image and this image is captured and directly projected toward a common plane. A mirror for each non-reflecting mirror, which are symmetrically disposed behind each non-reflecting mirror also captures the image and this is reflected with a predetermined incidence angle over the rear part of the non-reflecting mirrors. The image reflected over the rear part of the non-reflecting mirrors is projected toward coincidence with the rays captured by the non-reflecting mirrors producing an image with a three dimensions effect.

6 Claims, 1 Drawing Sheet

METHOD AND SYSTEM FOR RECEIVING AND TRANSFERRING IMAGES IN THREE DIMENSIONS

FIELD OF THE INVENTION

This invention consists of a method and a system for receiving and transferring images in three dimensions, and, more, specifically, of a receiver-transporter device (apparatus) of third dimension.

BACKGROUND OF THE INVENTION

For quite a long time there has been a need for observing images in three dimensions showing their width, length and depth. To this date, the images received on television, video, photography, only show two dimensions: width and length. But these images never gave a clear idea of the depth in which the observed object or images were located.

To this date, there are some techniques for observing images in three dimensions, such as stereoscopic projectors, that includes a disc with a series of images that include two equal photographs of each scene, and they are mounted diametrically opposed, showing a history of some tale or story or representing scenes of a locality. This way, by means of a pair of lenses and due to the de-phasing of the photograph, the images can be observed in three dimensions.

Another form used with the intention of observing the images in three dimensions has been by means of using special lenses given to the spectator when projecting some movie films in movie theaters.

Despite these efforts, to this date, there is not a device capable of receiving and transferring images in three dimensions in a simple form, thus avoiding the need of using special lenses for observing the images in three dimensions.

To this end, therefore, the present invention can receive and transfer three dimensional images in any type of camera, be this a video, television or movie camera, and that they can be directly sent to any kind of video receiver, showing the images in three dimensions, that is, showing its width, length and depth. This system can be also applied to photographic cameras that will allow photographing in a third dimension.

Likewise, due to the fact that there is no interference in the colors, by means of this system, it is much easier to assimilate the images in three dimensions, than when they are projected in two dimensions.

SUMMARY OF THE INVENTION

This invention relates to a method and a system for receiving and transferring images in three dimensions and it includes a supporting structure. The device also includes at least one first, non-reflecting image receiver section that allows the free pass of one first series of incident rays from each one of the captured images toward a common plane. This image receiver section includes one reflecting section which receives one second series of incident rays which is reflected on the reflecting section of the first section with a predetermined incidence angle and is, afterwards, projected as a reflected ray forming an angle with the normal and is aimed as a series of incident rays to project the captured images coinciding with the first incident rays towards the common plane, to simultaneously transfer the captured images in three dimensions.

The method for receiving and transferring images in three dimensions includes the following two phases: receiving a first series of incident rays of images through a first, non-reflecting section, i.e., a receiver of images. That allows the free pass of the captured images towards a common plane. Next, receiving simultaneously, a second series of incident rays on a second reflecting section; transferring the second series of incident rays as reflected rays towards a reflecting section of the first, non-reflecting, section, forming an angle with the normal; and, again, transferring the incident rays in coincidence with the first incident rays towards said common plane, to simultaneously transfer all the captured images in three dimensions.

Additionally, it is therefore an object of this invention to furnish a method and system for receiving and transferring the three dimensional images to any type of camera, be it video, photographic or television, thus showing the captured images in three dimensions.

It is another object of this invention to furnish a method and system for receiving and transferring images in three dimensions, in a simple form, avoiding the need of the use of special lenses in order to observe the images in three dimensions.

An additional object of the invention is to furnish a method and system for receiving and transferring images in three dimensions allowing the capturing of the image in stereovision and sending it to any video receiver.

These, and other object and advantages of this invention, will be made more evident to those of skill in the field, with the detailed description that follows, illustrated in the following drawing.

BRIEF DESCRIPTION OF THE DRAWING

A description of the invention follows, referring to a specific modality of the said invention, illustrated by the attached drawing in which the same numbers are referring to the same parts in the drawing, in which.

DETAILED DESCRIPTION OF THE INVENTION

Figure 1:
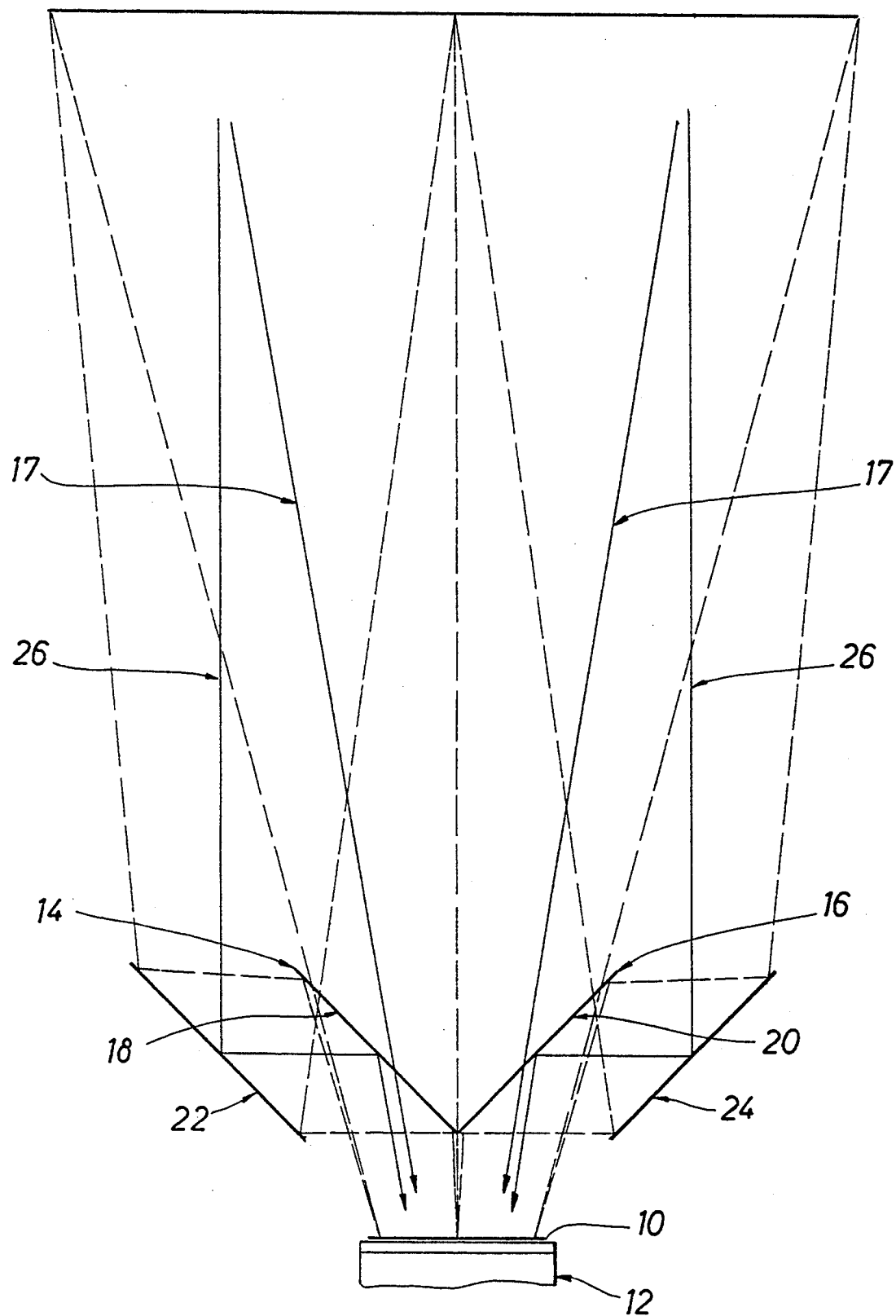
FIG. 1 is a schematic diagram of the system for receiving and transferring images in three dimensions of the present invention.

Referring to a specific modality of the system for receiving and transferring images in three dimensions, as illustrated in FIG. 1, it is shown a common plane 10, that can be the inlet of a lens 12, of a video, movie or television camera (not shown).

A first set of non-reflecting glasses 14, 16, image receivers, allowing the free pass of one first series of incident rays 17, of each one of the captured images that are projected towards a common plane 10. This said first set of non-reflecting glasses 14, 16, image receivers allowing the free pass of one first series of incident rays 17, of each one of the captured images that are directly projected towards a common plane 10. Said first set of non-reflecting glasses 14,16, consisting of a reflecting face 18, 20, on its rear side. As it can be observed in FIG. 1, the non-reflecting glasses 14, 16 are placed symmetrically with respect with each other with an angle of approximately 90 degrees. The vertex on which concur the two glasses 14, 16 is aimed towards the central part of the common plane 10.

A second set of reflecting mirrors 22, 24 detached, one from the other are parallelly placed behind each of the non-reflecting glasses 18, 20. This second set of reflecting mirrors 22, 24 also receive a series of incident rays 26 of the captured image, which are reflected on the reflecting face 18, 20 of the first non-reflecting glasses 14, 16 with a predetermined incidence angle. These incident rays 26, are afterwards projected as reflected rays forming an angle with the normal, and, are aimed as incident rays towards the common plane 10. This way, the images that are captured through the first non-reflecting glasses 14, 16 and the reflecting mirrors 22, 24 are made to coincide in the common plane 10, to capture the image in stereovision, and transfer, simultaneously the captured images in three dimensions.

Such second set of reflecting mirrors 22, 24 can be angularly adjusted and/or longitudinally, be means of an adequate mechanism (not shown), to move this angle of entry of the incident rays 26, and be able to vary the distance of the received images.

It is convenient to indicate that all the ensemble of the non-reflecting glasses 14, 16, and reflecting mirrors 22,24 can be internally coupled on any structure (not shown) that, according to the design, can be coupled on any type of video, movie or television camera. Also, said principle can be internally coupled on any image receiving device so that to be able to posteriorly project such captured images in three dimensions.

Thus, the method for receiving and transferring images in three dimensions comprising the steps of:

a) receiving a first series of incident rays of a captured image directly through non-reflecting surfaces, allowing the free pass of the captured image toward a common plane;

b) receiving simultaneously a second series of incident rays on second reflecting surfaces; and, c) projecting the second series of incident rays with a predetermined incidence angle in a rear part of the non-reflecting surfaces, and subsequently projecting the reflected image from the second series of incident rays toward coincidence with the image captured by the non-reflecting surfaces producing an image with a three dimensional effect.

The method for receiving and transferring images in three dimensions in the above mentioned phase "b" may include the step of:

adjusting angularly and/or longitudinally, the entry angle of the second incident rays and varying the distance of the received images.

Reference has been made of a specific modality of the method and system for receiving and transferring images in three dimensions, resulting, evidently, that it is possible to take any other arrangement and similar application under this principle, that may be able to receive and transfer images in stereovision and simultaneously transfer the captured images in three dimensions.

In accordance with the aforesaid, it must be understood that those of skill in the field could effect changes in the design and materials of the method and system of this invention that would be included into the spirit and reach of the invention being hereby claimed as per the following claims.

I claim:

1. A system for receiving and transferring captured images in three dimensions, comprising:

at least two first receiving surfaces, each of said first receiving surfaces having a non-reflecting front face and a reflecting rear face, said first receiving surfaces disposed in a V-shaped configuration which allows the transparent passage of a captured image and projection of this image toward a common plane; and at least a reflecting surface symmetrically disposed behind each first receiving surface to capture the image and reflect said image with a predetermined incidence angle over said rear face of each of the first receiving surfaces, and subsequently projecting the reflected image toward coincidence with the image captured by the first receiving surfaces producing an image with a three dimensional effect.

2. The system for receiving and transferring captured images in three dimensions in accordance with claim 1, wherein the reflecting surfaces are mirrors.

3. The system for receiving and transferring captured images in three dimensions in accordance with claim 1, wherein the reflecting surfaces are parallel behind each of said first receiving surfaces.

4. The system for receiving and transferring captured images in three dimensions in accordance with claim 1, wherein the reflecting surfaces are adjusted angularly on longitudinally, in order to move the angle of entry of the incident rays and to vary the distance of the received images.

5. A method for receiving and transferring captured images in three dimensions comprising the steps of:

a) receiving a first series of incident rays of a captured image directly through at least two first receiving surfaces, each of said first receiving surfaces having a non-reflecting front face and a reflecting rear face, allowing the transparent passage of the captured image toward a common plane;

b) receiving simultaneously a second series of incident rays in a second reflecting surface; and, c) projecting the second series of incident rays with a predetermined incidence angle on each said reflecting rear face, and subsequently projecting the reflected image form the second series of incident rays toward coincidence with the image captured by the first receiving surface producing an image with a three dimensional effect.

6. The method for receiving and transferring captured images in three dimensions in accordance with claim 5 further comprising the step of;

adjusting angularly and/or longitudinally the entry angle of the second incident rays on the rear face on the first receiving surfaces and to vary the distance of the captured image.

* * * * *